US012585616B2

(12) United States Patent
Santhar et al.

(10) Patent No.: US 12,585,616 B2
(45) Date of Patent: Mar. 24, 2026

(54) CONTEXT AWARE EDGE COMPUTING AND PROGRESSIVE DEPLETION OF CONTENT

(71) Applicant: International Business Machines Corporation, Armonk, NY (US)

(72) Inventors: Sathya Santhar, Ramapuram (IN); Sridevi Kannan, Katupakkam (IN); Sarbajit K. Rakshit, Kolkata (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 18/490,844

(22) Filed: Oct. 20, 2023

(65) Prior Publication Data

US 2025/0130976 A1      Apr. 24, 2025

(51) Int. Cl.
  *G06F 16/16*       (2019.01)
  *G06F 16/41*       (2019.01)
(52) U.S. Cl.
  CPC ............ *G06F 16/162* (2019.01); *G06F 16/41* (2019.01)
(58) Field of Classification Search
  None
  See application file for complete search history.

(56) References Cited

U.S. PATENT DOCUMENTS 9,495,338 B1      11/2016  Hollis et al.
11,102,269 B1      8/2021  Gupta 11,611,798 B2      3/2023  Hwang et al.
2009/0070533 A1*   3/2009  Elazary ............... H04L 67/5682
                                                      711/159
2013/0162664 A1*   6/2013  Peacock .................... G06T 1/60
                                                      345/543
2014/0067758 A1*   3/2014  Boldyrev .............. G06F 9/5088
                                                      707/610

(Continued)

FOREIGN PATENT DOCUMENTS

WO        2013090699 A1     6/2013

OTHER PUBLICATIONS

Galteri, et al, "Fast Video Quality Enhancement using GANs", https://www.researchgate.net/publication/336710072, (Retrieved: Aug. 10, 2023), 2019, pp. 1065-1067.

(Continued)

*Primary Examiner* — Richard L Bowen
(74) *Attorney, Agent, or Firm* — Cantor Colburn LLP; Jordan Schiller

(57) ABSTRACT

A computer-implemented method for context aware edge computing and progressive depletion of content is provided. The computer-implemented method includes receiving, at an edge server, a request for a media file sourced from a main server and having media file data temporarily stored on the edge server, determining, from the request, a probability value that a similar request will be received at the edge server, comparing the probability value with a predefined probability threshold value, identifying a portion of the media file data to be deleted from results of the comparing and from a capability of a model stored on the edge server to regenerate the media file data that has been deleted and deleting the portion of the media file data in accordance with results of the identifying.

14 Claims, 9 Drawing Sheets

(56)                    References Cited

U.S. PATENT DOCUMENTS

| | | | |
|---|---|---|---|
| 2014/0279854 A1* | 9/2014 | Scanlon | G06F 16/162 |
| | | | 707/609 |
| 2015/0180968 A1 | 6/2015 | Schapira et al. | |
| 2016/0198016 A1* | 7/2016 | Tiger | H04L 45/742 |
| | | | 709/213 |
| 2021/0166165 A1* | 6/2021 | Nomura | G06F 3/0604 |
| 2021/0199850 A1 | 7/2021 | Schmude et al. | |
| 2021/0390062 A1* | 12/2021 | Wen | G06F 12/0868 |

OTHER PUBLICATIONS

Hosseini, et al, "Inception-inspired LSTM for Next-frame Video Prediction", arXiv preprint, 2020, 7 pages.
Kanrar, et al, KANRAR, et al, "Content Delivery Through Hybrid Architecture in Video on Demand System", Ingénierie des Systèmes d'Information, vol. 24, No. 3, 2019, pp. 289-301.
Kwon, et al, "Predicting Future Frames Using Retrospective Cycle GAN", https://www.researchgate.net/publication/332978506, (Retrieved: Aug. 10, 2023), 11 pages.
Rouhani, et al, "Xp-GAN: Unsupervised Multi-object Controllable Video Generation", arXiv preprint, 2021, 8 pages.
Sulun, Serkan Sulun, "Deep Learned Frame Prediction for Video Compression", arXiv preprint, 2018, 71 pages.

* cited by examiner

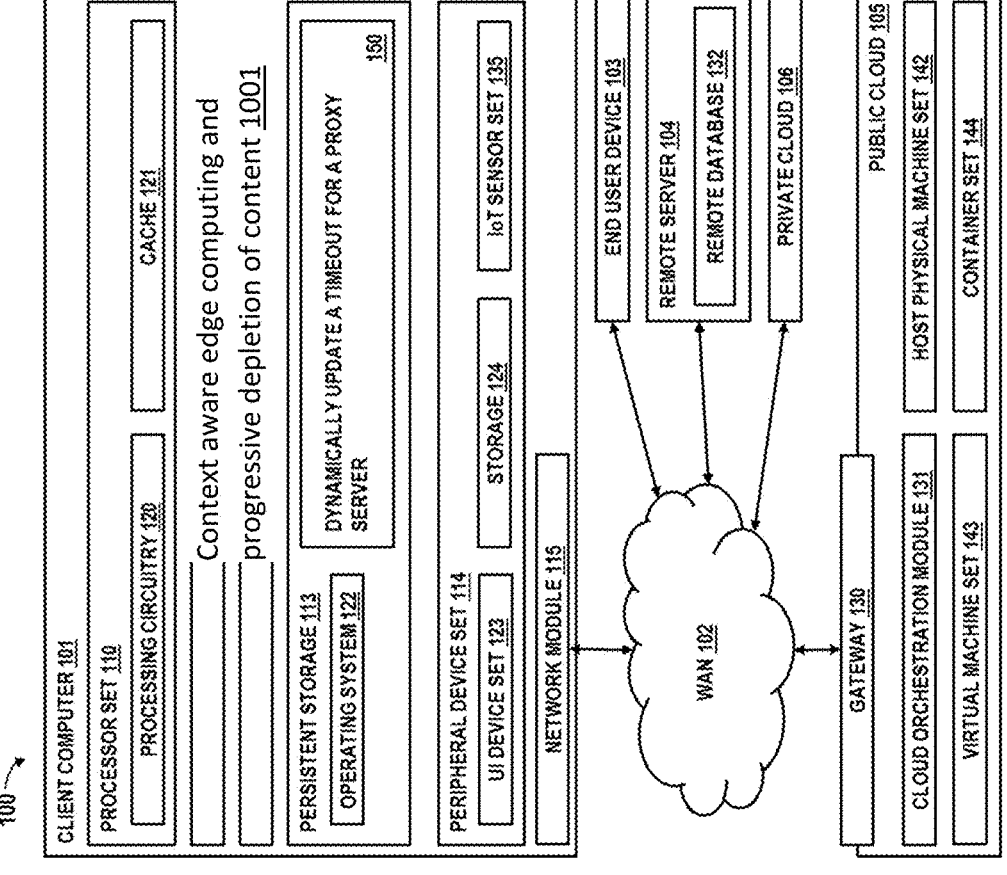

CLIENT COMPUTER 101

PROCESSOR SET 110

PROCESSING CIRCUITRY 120          CACHE 121

Context aware edge computing and progressive depletion of content 1001

DYNAMICALLY UPDATE A TIMEOUT FOR A PROXY SERVER          150

PERSISTENT STORAGE 113

OPERATING SYSTEM 122

IoT SENSOR SET 135

PERIPHERAL DEVICE SET 114

UI DEVICE SET 123          STORAGE 124

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131          HOST PHYSICAL MACHINE SET 142

VIRTUAL MACHINE SET 143          CONTAINER SET 144

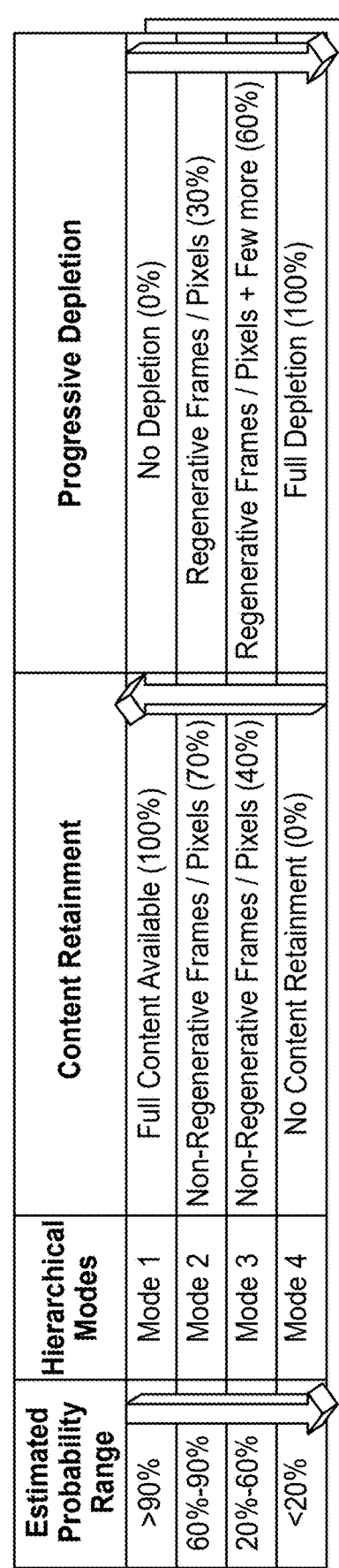

Hierarchical Modes of our classifier for Content Retainment and Progressive Depletion

| Estimated Probability Range | Hierarchical Modes | Content Retainment | Progressive Depletion |
|---|---|---|---|
| >90% | Mode 1 | Full Content Available (100%) | No Depletion (0%) |
| 60%-90% | Mode 2 | Non-Regenerative Frames / Pixels (70%) | Regenerative Frames / Pixels (30%) |
| 20%-60% | Mode 3 | Non-Regenerative Frames / Pixels (40%) | Regenerative Frames / Pixels + Few more (60%) |
| <20% | Mode 4 | No Content Retainment (0%) | Full Depletion (100%) |

| Interaction with Main Server | Resolution Quality/Speed/Storage |
|---|---|
| No Interaction (0%) | High Resolution/High Speed / Full Storage |
| Partial Interaction with Main Server (20%) | High Resolution/High Speed / Low Storage |
| Partial Interaction with Main Server (50%) | Low Resolution/High Speed / Low Storage |
| Interaction with Main Server (100%) | Low Resolution/Low Speed / Low Storage |

Internal Mapping Table to identify the contributing frames / pixels

| Frame # / Pixel # | Frames/Pixels contributing for Regeneration | Resolution Quality of Regenerated output |
|---|---|---|
| Frame #1 | Frame 2, Frame 3, Frame 4, Frame 5, Frame 6 | High Reolution |
| Frame #1 | Frame 2, Frame 3, Frame 6 | Low Resolution |
| Frame #2 | Nil (Regeneration not possible) | N/A |
| Frame #3 | Frame 4, Frame 6, Frame 8 | High Resolution |

CONTEXT AWARE EDGE COMPUTING AND PROGRESSIVE DEPLETION OF CONTENT

BACKGROUND

The present invention generally relates to edge computing, and more specifically, to a method and a system for context aware edge computing and progressive depletion of content.

Edge computing is a distributed computing paradigm that brings computation and data storage closer to the sources of data. This is expected to improve response times and save bandwidth. Edge computing is typically regarded as an architecture rather than a specific technology, and a topology-sensitive and a location-sensitive form of distributed computing.

SUMMARY

Embodiments of the present invention are directed to a computer-implemented method for context aware edge computing and progressive depletion of content. The computer-implemented method includes receiving, at an edge server, a request for a media file sourced from a main server and having media file data temporarily stored on the edge server, determining, from the request, a probability value that a similar request will be received at the edge server, comparing the probability value with a predefined probability threshold value, identifying a portion of the media file data to be deleted from results of the comparing and from a capability of a model stored on the edge server to regenerate the media file data that has been deleted and deleting the portion of the media file data in accordance with results of the identifying.

Embodiments of the present invention are directed to a computer program product for context aware edge computing and progressive depletion of content. The computer program product includes one or more computer readable storage media having computer readable program code collectively stored on the one or more computer readable storage media. The computer readable program code is executed by a processor of a computer system to cause the computer system to perform a method. The method includes receiving, at an edge server, a request for a media file sourced from a main server and having media file data temporarily stored on the edge server, determining, from the request, a probability value that a similar request will be received at the edge server, comparing the probability value with a predefined probability threshold value, identifying a portion of the media file data to be deleted from results of the comparing and from a capability of a model stored on the edge server to regenerate the media file data that has been deleted and deleting the portion of the media file data in accordance with results of the identifying.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform steps for context aware edge computing and progressive depletion of content. The steps for the context aware edge computing and progressive depletion of content include receiving, at an edge server, a request for a media file sourced from a main server and having media file data temporarily stored on the edge server, determining, from the request, a probability value that a similar request will be received at the edge server, comparing the probability value with a predefined probability threshold value, identifying a portion of the media file data to be deleted from results of the comparing and from a capability of a model stored on the edge server to regenerate the media file data that has been deleted and deleting the portion of the media file data in accordance with results of the identifying.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1 is a schematic diagram of a computing environment for executing a computer-implemented method for selectively capturing traffic in a service mesh to simulate and address an issue with a service invoke chain in accordance with one or more embodiments of the present invention;

FIG. 7 is a graphical illustration of a hierarchical mode classier of the edge computing architecture of FIG. 4 in accordance with one or more embodiments of the present invention; and FIG. 8 is a graphical illustration of an internal mapping table of the edge computing architecture of FIG. 4 in accordance with one or more embodiments of the present invention.

Figure 2:
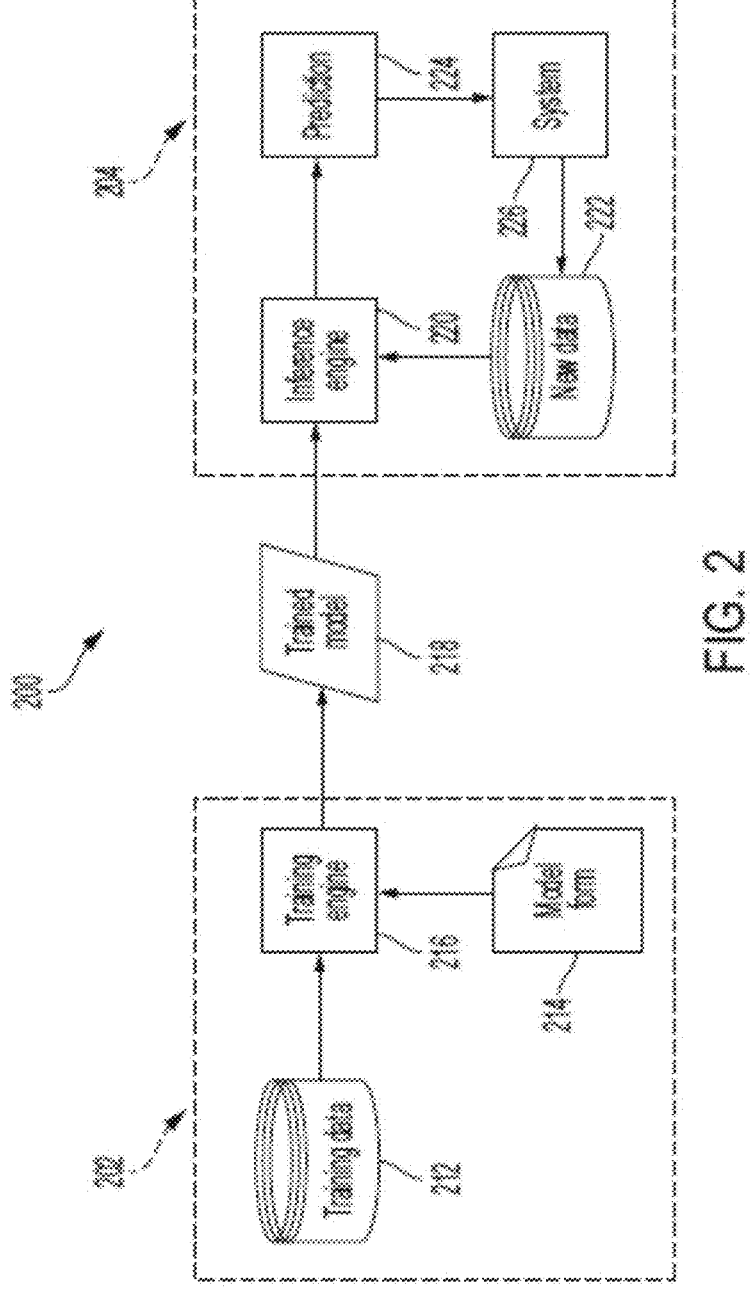
FIG. 2 is a block diagram of components of a machine learning training and inference system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, a computer or computing device 100 that implements a computer-implemented method for context aware edge computing and progressive depletion of content is provided in accordance with one or more embodiments of the present invention is provided. The computer or computing device 100 of FIG. 1 contains an example of an environment for the execution of at least some of the computer code involved in performing the inventive methods, such as the block 1001 of the computer-implemented method for context aware edge computing and progressive depletion of content. In addition to the computer-implemented method for context aware edge computing and progressive depletion of content of block 1001, the computer or computing device 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the computer-implemented method of block 1001, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

The computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of the computer-implemented method, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

The processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In the computer-implemented method, at least some of the instructions for performing the inventive methods may be stored in the block 1001 of the computer-implemented method in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in the block 1001 of the computer-implemented method typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts a block diagram of components of a machine learning training and inference system 200. The machine learning training and inference system 200, in accordance with one or more embodiments of the invention, can utilize machine learning techniques to perform tasks, such as those for context aware edge computing and progressive depletion of content. More specifically, one or more embodiments of the present invention described herein can incorporate and utilize rule-based decision making and artificial intelligence (AI) reasoning to accomplish the various operations described herein, namely receiving, at an edge server, a request for a media file sourced from a main server and having media file data temporarily stored on the edge server, determining, from the request, a probability value that a similar request will be received at the edge server, comparing the probability value with a predefined probability threshold, identifying a portion of the media file data to be deleted from results of the comparing and from a capability of a model stored on the edge server to regenerate the media file data that has been deleted and deleting the portion of the media file data in accordance with results of the identifying.

Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information. In one or more embodiments of the present invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

GANs are an exciting recent innovation in machine learning and typically use an approach towards generative modelling using deep learning methods, such as CNNs. GANs are a clever way of training a generative model by framing the problem as a supervised learning problem with two sub-models: the generator model that we train to generate new examples and the discriminator model that tries to classify examples as either real (from the domain) or fake (generated). The two models are trained together in a zero-sum adversarial game until the discriminator model is fooled about half the time, meaning the generator model is generating plausible examples.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the present invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Turning now to an overview of technologies that are more specifically relevant to aspects of the invention, edge computing is a distributed information technology (IT) architecture in which client data is processed at the periphery of the network, as close to the originating source as possible. Data is the lifeblood of modern business, providing valuable business insight and supporting real-time control over critical business processes and operations. Today's businesses are awash in an ocean of data, and huge amounts of data can be routinely collected from sensors and IoT devices operating in real time from remote locations and inhospitable operating environments almost anywhere in the world.

This virtual flood of data is also changing the way businesses handle computing. The traditional computing paradigm built on a centralized data center and everyday internet isn't well suited to moving endlessly growing rivers of real-world data. Bandwidth limitations, latency issues and unpredictable network disruptions can all conspire to impair such efforts. Businesses are responding to these data challenges through the use of edge computing architecture.

This employment of edge computing effectively moves some portion of storage and computing resources out of the central data center and closer to the source of the data itself. Rather than transmitting raw data to a central data center for processing and analysis, that work is instead performed where the data is actually generated whether that's a retail store, a factory floor, a sprawling utility or across a smart city. Only the result of that computing work at the edge, such as real-time business insights, equipment maintenance predictions or other actionable answers, is sent back to the main data center for review and other human interactions.

Video compression techniques are also exploited and involve processes of reducing the total number of bits needed to represent a given image or video sequence. Video compression is generally performed by a program with a specific algorithm or formula for determining the best way to shrink the size of the data and it often includes a process of encoding a video file in such a way that it consumes less space than the original file and is easier to transmit over networks or the Internet (i.e., by eliminating redundant and non-functional data from the original video file). Video encoding is the process of compressing and potentially changing the format of video content, sometimes even changing an analog source to a digital one. Upon decompression for playback, an approximation of the original is created. The more compression applied, the more data is thrown out and the worse the approximation looks versus the original.

Video prediction is the task of predicting future frames given past video frames and is a component process of decompression for video playback. The ability to predict, anticipate and reason about future outcomes is a key component of intelligent decision-making systems. Considering the success of deep learning in computer vision, deep-learning-based video prediction emerged as a promising research direction. Defined as a self-supervised learning task, video prediction represents a suitable framework for representation learning, as it demonstrated potential capabilities for extracting meaningful representations of the underlying patterns in natural videos. The next-frame prediction is of great importance in the field of artificial intelligence by predicting future possibilities and making decisions in advance.

In many cases, next-frame prediction can be taken as a spatiotemporal problem. That is, given a sequence of images in continuous time steps, an ability to predict the next frame of a video is performed by time sequence learning.

Next-frame prediction architectures can be categorized into two main types. These include sequence-to-one architectures and sequence-to-many architectures. In sequence-to-one architectures, an immediate next frame is predicted using the sequence of previous frames (i.e., I/P: t frames; O/P: t+1 frame). In sequence-to-many architectures, next few frame sequences are predicted using the sequence of previous frames (i.e., I/P: t frames; O/P: t+k frames). Currently, it is seen that multiple network structures are used to build next-frame prediction models. Auto-encoders and generative adversarial networks (GANs) are widely used to generate an entirely new video (as in VIDEO SYNTHESIS) or to predict and generate the next-frame(s) given current and previous frames of a video (as in VIDEO PREDICTION).

Presently, edge computing architectures tend to focus only on retaining content in cache based on a set static period. When websites respond to servers with the requested content, they attach the content's time-to-live (TTL) as well, letting the servers know how long to store it. The TTL is stored in a part of the response called the HTTP header, and it specifies for how many seconds, minutes or hours content will be cached. When the TTL expires, the cache removes the content. Some content delivery networks (CDNs) will also purge files from the cache early if the content is not requested for a while, or if a CDN customer manually purges certain content.

There are no edge computing architectures that auto-tune to retain content in cache without affecting computation and quality of file. There is also no availability of prediction functionality for storing content in a cache. In other words, there is no way to balance edge computing storage techniques based on frame prediction.

Turning now to an overview of the aspects of the invention, one or more embodiments of the invention address shortcomings of the above-described approaches by providing a hybrid model that makes cached content available at the right time when a user requests it and thereby addresses vital infrastructure challenges such as bandwidth limitations, high-quality real-time media streaming, excess latency and network congestion. This is achieved through optimized context aware edge computing processes and progressive depletion of content in cache based on a new prediction model.

For edge computing architectures and CDNs, copies of files are stored in cache or a temporary storage location. When a user request for specific content and/or a file that needs to be streamed back in response is received, a process is enabled to understand the context of the request and to control the progressive depletion of content. Edge servers cache content (e.g., images, videos, webpages, etc.) in proxy servers that are located closer to end users than origin servers. Because the servers are closer to the user making the request, a CDN can deliver content more quickly. A GAN model predicts the next frame(s) and/or pixel(s) in a media file using the previous frames and/or surrounding pixels respectively. The GAN model is trained to generate the next frame(s) and/or pixel(s) in a video and/or image and compares the predicted frame(s) and/or pixel(s) to the actual ones to decide if the specific frame(s) and/or pixel(s) can be made as a placeholder or proxy packet during storage in the edge server so that the original frame(s) and/or pixel(s) can be re-generated only when the request is placed.

The process is executed in the edge server and is made aware of the context of the request so that it decides on the followings: content retainment (i.e., which frames need to be retained and when do they have to be retained) and progressive depletion (i.e., which frames need to be deleted and when do they have to be deleted).

Based on certain parameters of the request (e.g., frequency, vicinity, time, etc.) to the CDN, a probability value is calculated to decide on content retainment. A predefined threshold probability range value is set for comparing the calculated value to decide on the content retainment. When the request hits the edge server, the GAN model calculates the probability value based on the request and compares it to the threshold value. Based on the threshold value, there could be various hierarchical modes predicted to decide on the content retainment and content depletion.

The above-described aspects of the invention address the shortcomings of known approaches by providing a computer-implemented method for context aware edge computing and progressive depletion of content. The computer-implemented method includes receiving, at an edge server, a request for a media file sourced from a main server and having media file data temporarily stored on the edge server, determining, from the request, a probability value that a similar request will be received at the edge server, comparing the probability value with a predefined probability threshold, identifying a portion of the media file data to be deleted from results of the comparing and from a capability of a model stored on the edge server to regenerate the media file data that has been deleted and deleting the portion of the media file data in accordance with results of the identifying.

Figure 3:
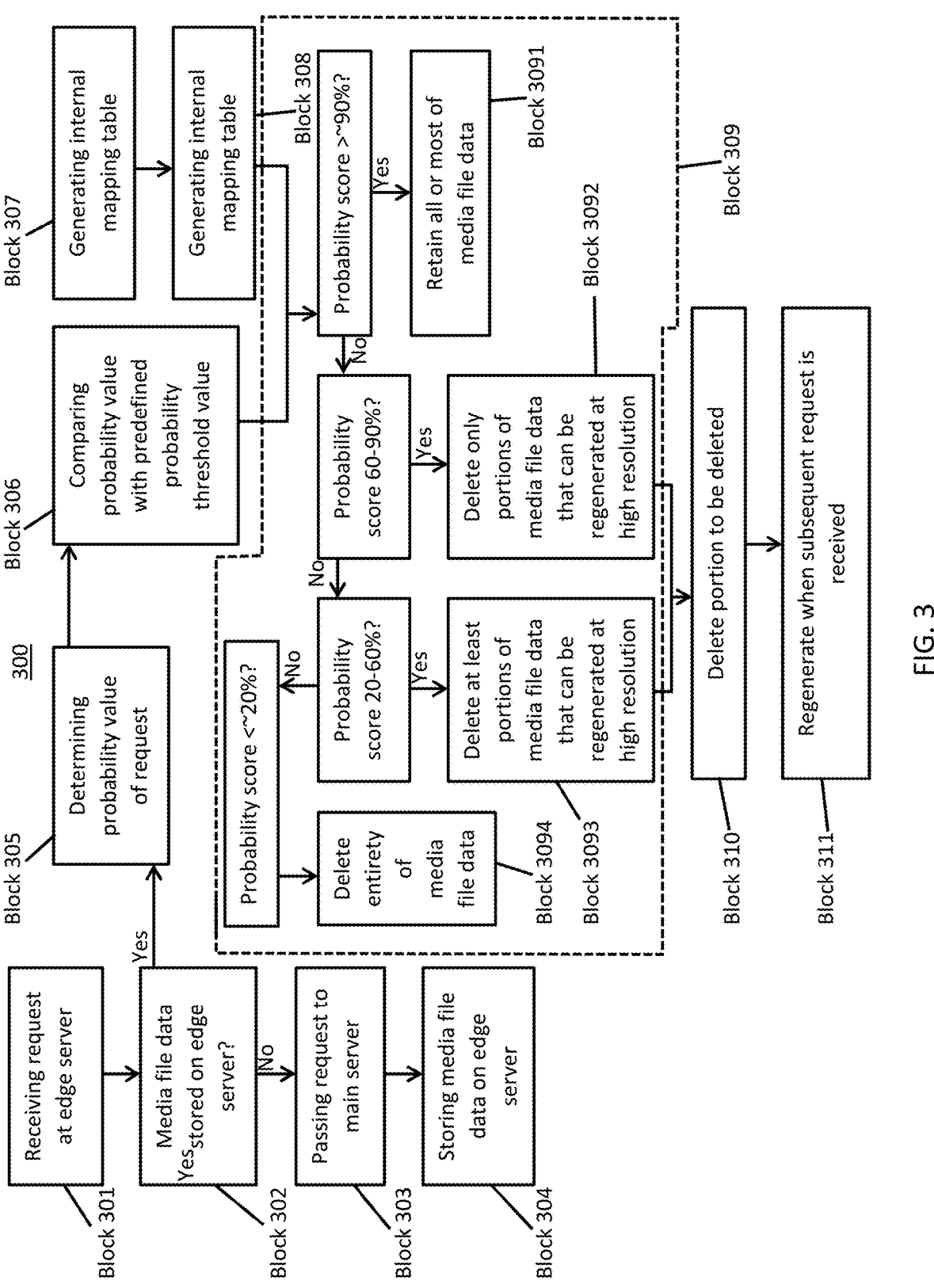
FIG. 3 is a flow diagram illustrating a computer-implemented method for context aware edge computing and progressive depletion of content in accordance with one or more embodiments of the present invention.

With reference to FIG. 3, a computer-implemented method 300 is provided for context aware edge computing and progressive depletion of content. As shown in FIG. 3, the computer-implemented method 300 includes receiving, at an edge server, a request for a media file (e.g., a video file or an image file) that is initially or originally sourced from a main server (block 301) and determining whether media file data of the media file is stored on the edge server (block 302). If the media file data is not stored on the edge server (i.e., because it has been deleted from a cache of the edge server), the computer-implemented method includes passing the request to or otherwise requesting the media file data from the main server (block 303) and subsequently, upon receiving the media file data from the main server, storing the media file data received from the main server on the edge server (block 304). In an event the media file data is determined to be temporarily stored on the edge server by the determining of block 302, the computer-implemented method 300 also includes determining, from the request, a probability value (i.e., from a frequency of similar requests, a vicinity of an origin of the request to the edge server and a time of the request) that a similar request will be received at the edge server (block 305), comparing the probability value with a predefined probability threshold value (block 306), identifying a portion of the media file data to be deleted from results of the comparing and from a capability of a model stored on the edge server to regenerate the media file data that has been deleted (block 309) and deleting the portion of the media file data in accordance with results of the identifying (block 310). The computer-implemented method 300 can further include regenerating the portion of the media file data that has been deleted to satisfy a subsequent request (block 311). The identifying of the portion of the media file data to be deleted from results of the comparing and from the capability of a model stored on the edge server to regenerate the media file data that has been deleted at block 309 can optionally be preceded by generating, at the edge server, an internal mapping table to map elements of the media file data to surrounding elements of the media file data (block 307) and referring to the internal mapping table to ascertain the capability of the model to regenerate the media file data that has been deleted (block 308).

In accordance with embodiments, in an event the probability value is determined to be about 90% or higher of the predefined threshold value from the results of the comparing of block 309, the computer-implemented method 300 includes retaining a relatively large portion or an entirety of the media file data on the edge server (block 3091). As such, when a subsequent and similar request for the media file is received, the media file data is retained on the edge server and the request need not be passed to the main server. To the extent that any of the media file data is deleted, however, it is to be understood that the deleted media file data can be regenerated by the model stored on the edge server with a high resolution of about 1080 pixels, for example, since the amount of media file data needing to be regenerated is relatively small compared to the size of the media file data file.

In accordance with embodiments, in an event the probability value is determined to be about 60-90% of the predefined threshold value from the results of the comparing of block 309, the computer-implemented method 300 includes determining that the portion of the media file data to be deleted from the edge server includes only the portion of the media file data that can be regenerated by the model stored on the edge server with a high resolution of about 1080 pixels, for example (block 3092). As such, when a subsequent and similar request for the media file is received, the media file data is mostly retained on the edge server with the portion that is not retained able to be regenerated by the model stored on the edge server and the request need not be passed to the main server.

In accordance with embodiments, in an event the probability value is determined to be about 20-60% of the predefined threshold value from the results of the comparing of block 309, the computer-implemented method 300 includes determining that the portion of the media file data to be deleted from the edge server includes at least the portion of the media file data that can be regenerated by the model stored on the edge server with a high resolution of about 1080 pixels, for example, and additional portions such as those that can be regenerated from surrounding frames and/or pixels with a decreased but still minimal resolution of about 720 pixels, for example (block 3093). As such, when a subsequent and similar request for the media file is received, the media file data is still mostly or partially retained on the edge server with the portion that is not retained able to be regenerated by the model stored on the edge server and the request need not be passed to the main server.

In accordance with embodiments, in an event the probability value is determined to be 20% or less of the predefined threshold value from the results of the comparing of block 309, the computer-implemented method 300 includes determining that an entirety of the media file data is to be deleted from the edge server (block 3094). As such, when a subsequent and similar request for the media file is received, the request is passed to the main server as in block 303.

Figure 4:
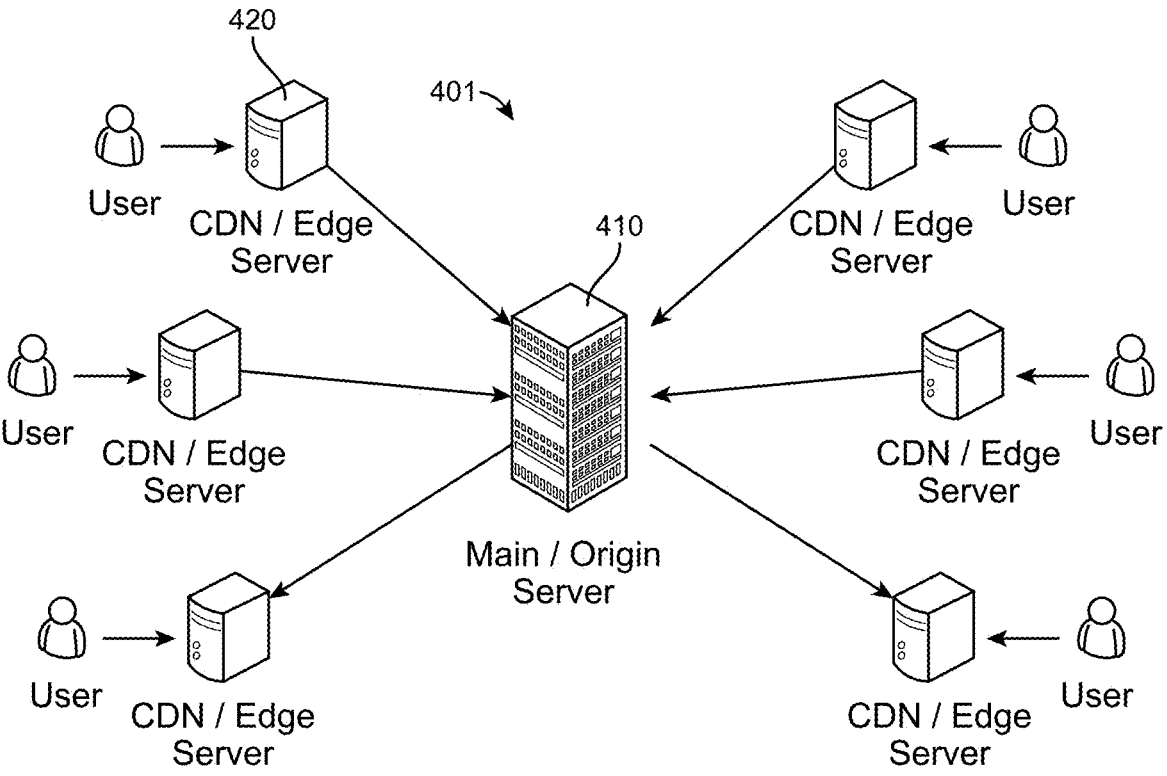
FIG. 4 is a schematic diagram illustrating an edge computing architecture for executing the computer-implemented method for context aware edge computing and progressive depletion of content of FIG. 3 in accordance with one or more embodiments of the present invention.

With reference to FIGS. 4-8, an edge computing architecture 401 is provided for the execution of the computer-implemented method 300 of FIG. 3. As shown in FIG. 4, the edge computing architecture 401 includes a main or origin server 410 (hereinafter referred to as a "main server 410"), on which a media file, such as a video file, is initially or originally stored, and CND/edge servers 420 (hereinafter referred to as "edge servers 420"). Each of the edge servers 420 is communicative with the main server 410 and is accessed by one or more users. Each of the edge servers 420 includes a cache or a temporary storage unit, a processing unit, and a GAN enabled model 421 (see FIG. 5) with a hierarchical mode classifier for content retainment and progressive depletion 422 (see FIGS. 6 and 7) and an internal mapping table 423 (see FIG. 8). The GAN enabled model 421 is capable of next-frame prediction (i.e., a predictive model) by reference to the hierarchical mode classifier for content retainment and progressive depletion 422 of FIGS. 6 and 7 and by reference to the internal mapping table 423 of FIG. 8. For purposes of clarity and brevity, the main server 410 is a video streaming server and the media file is a video file of a video stored thereon. When one of the users wants to view the video, the user sends a request to his/her edge server 420 for the video and the response of the edge server to this request will be described below.

Figure 5:
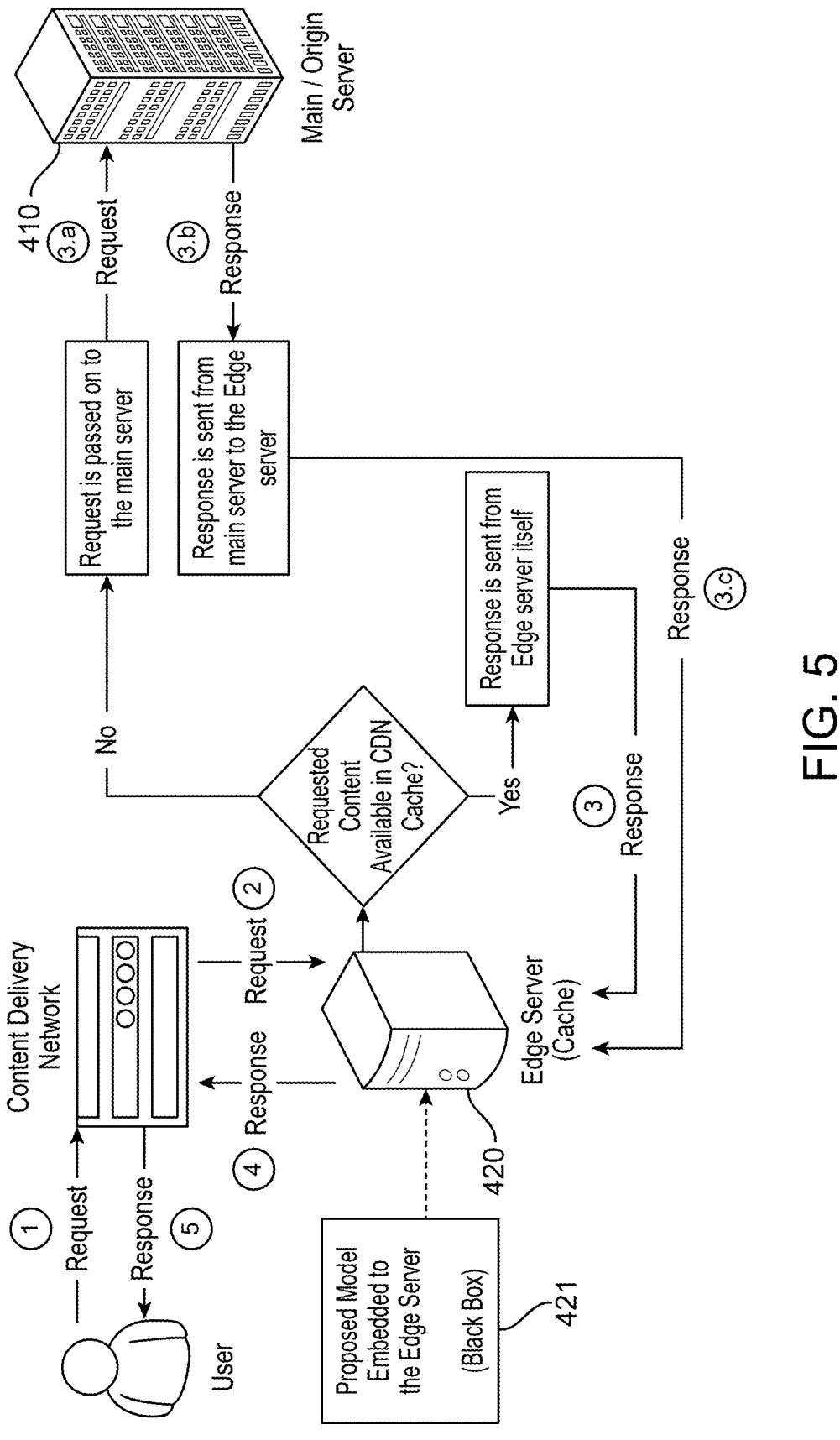
FIG. 5 is a graphical illustration of the computer-implemented method for context aware edge computing and progressive depletion of content of FIG. 3 being executed by the edge computing architecture of FIG. 4 in accordance with one or more embodiments of the present invention.
Figure 6:
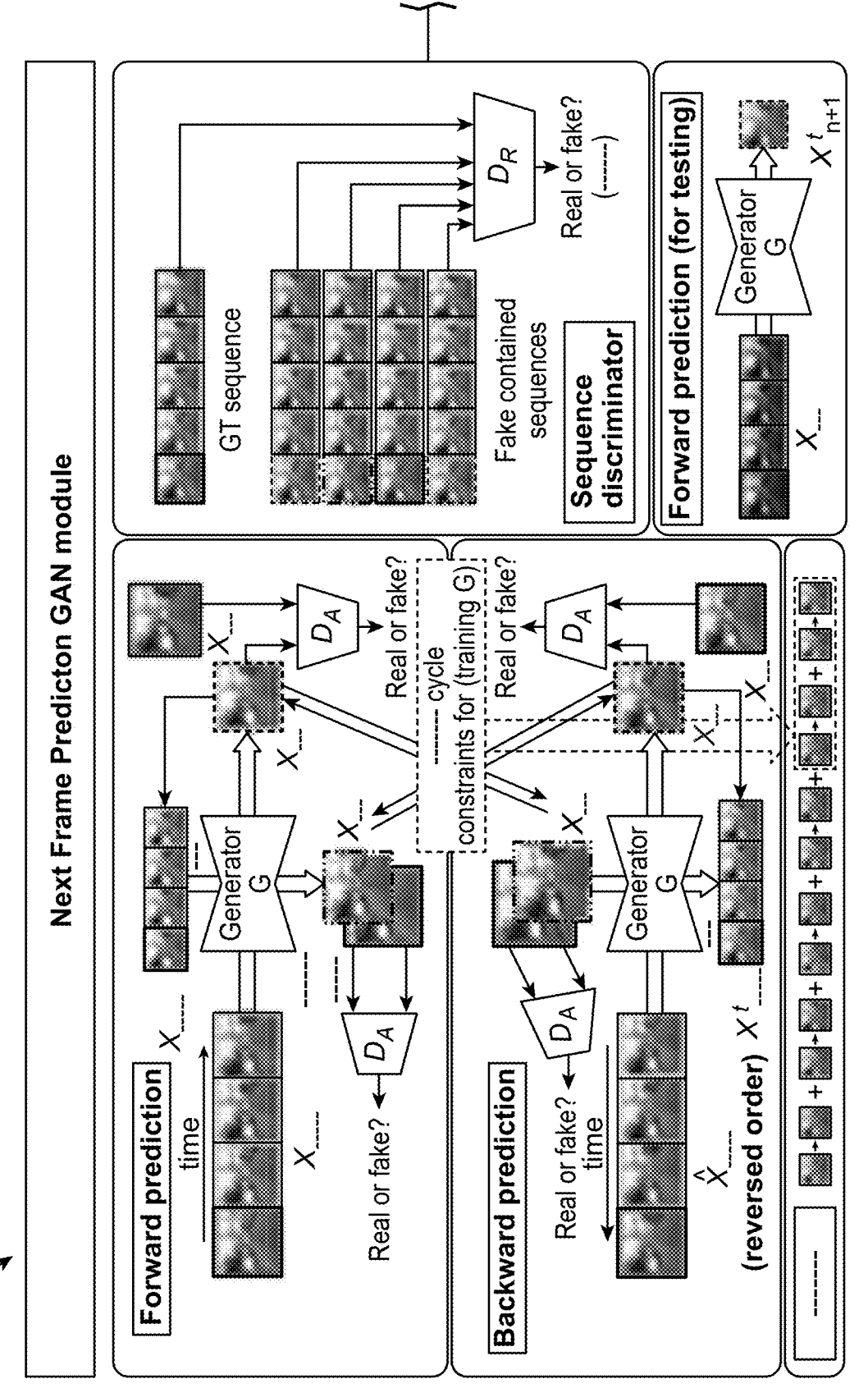
FIG. 6 are graphical illustrations of a GAN model and a hierarchical mode classier of the edge computing architecture of FIG. 4 in accordance with one or more embodiments of the present invention.

As shown in FIG. 5, when a user submits a request (1) for a video to the edge server 420 via a CDN (2), it is first determined whether the requested content is available in the cache or temporary storage of the edge server 420 (block 501).

If the requested content is stored in the cache or the temporary storage of the edge server 420, the request is passed the response (3) is sent to the user from the edge server 420 itself as response (4) (5) via the CDN. At this point, a decision about how much of the requested content is to be retained in the cache or temporary storage of the edge server 420 is made. As described above, this decision is made by calculating a probability that a similar request will be received by the edge server and by considering a capability of the model to regenerate portions of the requested content with a given resolution. As a general rule, a higher probability of a similar request being received is associated with a greater amount of the requested content being retained and a high probability of the similar request being retained in a relatively short time is associated with a greater amount of the requested content being retained. By contrast, as a general rule, a capability of the model to regenerate portions of the requested content with a high resolution can be associated with a decreased amount of the requested content being retained, since it can be regenerated. In some cases, the decision about how much of the request content is to be retained can be executed iteratively as time passes, with increasing time being associated with a greater degree of content depletion in accordance with request probability scores decreasing over time.

If the requested content is not stored in the cache or the temporary storage of the edge server 420, the request is passed to the main server 410 (3.a) and the response of the main server 410 (3.b) is sent to the edge server 420. The requested content is then stored in the cache or temporary storage of the edge server 420 and sent as a response (4) (5) to the user via the CDN. At this point, as above, a decision about how much of the requested content is to be retained in the cache or temporary storage of the edge server 420 is made. Again, as described above, this decision is made by taking into account a probability that a similar request will be received by the edge server and by considering a capability of the model to regenerate portions of the requested content with a given resolution. As a general rule, a higher probability of a similar request being received is associated with a greater amount of the requested content being retained and a high probability of the similar request being retained in a relatively short time is associated with a greater amount of the requested content being retained. By contrast, as a general rule, a capability of the model to regenerate portions of the requested content with a high resolution can be associated with a decreased amount of the requested content being retained, since it can be regenerated. In some cases, the decision about how much of the request content is to be retained can be executed iteratively as time passes, with increasing time being associated with a greater degree of content depletion in accordance with request probability scores decreasing over time.

Thus, in a case of the user accessing a training video that he and his colleagues are required to watch by the employer by a certain time, there may be a high probability of a similar request being received at an edge server that the user and his colleagues all access and therefore all or a significant portion of the video will be retained on the cache or temporary storage of the edge server 420. However, as time passes and it becomes closer to the certain time, portions of the content that can be depleted and regenerated at a high resolution (or at least the resolution of the original video) will begin to be depleted. Eventually (i.e., as the certain time passes), the portion of the content that can be depleted include those portions that cannot be regenerated without loss of resolution. This may be more acceptable in some scenarios in which video resolution is relatively unimportant. By some arbitrary date following the certain time, the entire video will be deleted from the cache or temporary storage of the edge server 420 and, in these cases, if a similar request is received, that request will be passed to the main server 410.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for context aware edge computing and progressive depletion of content, the computer-implemented method comprising:

embedding, on an edge server, a model which regenerates media file data portions of a media file, the media file being sourced from a main server and having media file data temporarily stored on the edge server;

receiving, at the edge server, a request for the media file;

determining, from the request, a probability value that a similar request will be received at the edge server;

comparing the probability value with a predefined probability threshold value;

identifying a portion of the media file data to be deleted from results of the comparing and from a capability of the model to regenerate the portion of the media file data to be deleted; and deleting the portion of the media file data in accordance with results of the identifying, wherein the identifying comprises considering the capability of the model to regenerate the portion of the media file data to be deleted with a given resolution, wherein the computer-implemented method further comprises:

receiving, at the edge server, a subsequent request for the media file;

regenerating, by the model, the portion of the media file data to satisfy the subsequent request; and not passing the subsequent request to the main server, wherein the model is a generative adversarial network (GAN) enabled model with a hierarchical mode classifier for content retainment and progressive depletion and an internal mapping table and the computer-implemented method further comprises:

generating, at the edge server, the internal mapping table to map elements of the media file data to previous frames and surrounding pixels of the media file data; and ascertaining the capability of the model to regenerate the media file data that has been deleted, wherein the media file comprises a video file and the regenerating, by the model, comprises next-frame prediction applied to the video file by reference to the hierarchical mode classifier for content retainment and progressive depletion and the internal mapping table.

2. The computer-implemented method according to claim 1, further comprising:

determining whether the media file data is stored on the edge server;

requesting the media file data from the main server; and storing the media file data received from the main server on the edge server.

3. The computer-implemented method according to claim 1, wherein the determining of the probability value comprises determining the probability value from a frequency of similar requests, a vicinity of an origin of the request to the edge server and a time of the request.

4. The computer-implemented method according to claim 1, wherein:

the media file is a first media file, a second media file, a third media file and a fourth media file, for the first media file, the probability value is about 90% or higher of the predefined probability threshold value and a large portion of the media file data of the first media file is retained on the edge server, for the second media file, the probability value is about 60-90% of the predefined probability threshold value and the portion of the media file data to be deleted of the second media file comprises only the portion of the media file data of the second media file that can be regenerated by the model, for the third media file, the probability value is about 20-60% of the predefined probability threshold value and the portion of the media file data to be deleted of the third media file comprises at least the portion of the media file data of the third media file that can be regenerated by the model, and, for the fourth media file, the probability value is about 20% or less of the predefined probability threshold value and the portion of the media file data to be deleted of the fourth media file comprises an entirety of the media file data of the fourth media file.

5. The computer-implemented method according to claim 1, further comprising:

generating, at the edge server, an internal mapping table to map elements of the media file data to surrounding elements of the media file data; and referring to the internal mapping table to ascertain the capability of the model to regenerate the media file data that has been deleted.

6. A computer program product for context aware edge computing and progressive depletion of content, the computer program product comprising one or more computer readable storage media having computer readable program code collectively stored on the one or more computer readable storage media, the computer readable program code being executed by a processor of a computer system to cause the computer system to perform a method comprising:

embedding, on an edge server, a model which regenerates media file data portions of a media file, the media file being sourced from a main server and having media file data temporarily stored on the edge server;

receiving, at the edge server, a request for the media file;

determining, from the request, a probability value that a similar request will be received at the edge server;

comparing the probability value with a predefined probability threshold value;

identifying a portion of the media file data to be deleted from results of the comparing and from a capability of the model to regenerate the portion of the media file data to be deleted; and deleting the portion of the media file data in accordance with results of the identifying, wherein the identifying comprises considering the capability of the model to regenerate the portion of the media file data to be deleted with a given resolution, wherein the method further comprises:

receiving, at the edge server, a subsequent request for the media file;

regenerating, by the model, the portion of the media file data to satisfy the subsequent request; and not passing the subsequent request to the main server, wherein the model is a generative adversarial network (GAN) enabled model with a hierarchical mode classifier for content retainment and progressive depletion and an internal mapping table and the method further comprises:

generating, at the edge server, the internal mapping table to map elements of the media file data to previous frames and surrounding pixels of the media file data; and ascertaining the capability of the model to regenerate the media file data that has been deleted, wherein the media file comprises a video file and the regenerating, by the model, comprises next-frame prediction applied to the video file by reference to the hierarchical mode classifier for content retainment and progressive depletion and the internal mapping table.

7. The computer program product according to claim 6, wherein the method further comprises:

determining whether the media file data is stored on the edge server;

requesting the media file data from the main server; and storing the media file data received from the main server on the edge server.

8. The computer program product according to claim 6, wherein the determining of the probability value comprises determining the probability value from a frequency of similar requests, a vicinity of an origin of the request to the edge server and a time of the request.

9. The computer program product according to claim 6, wherein:

the media file is a first media file, a second media file, a third media file and a fourth media file, for the first media file, the probability value is about 90% or higher of the predefined probability threshold value and a large portion of the media file data of the first media file is retained on the edge server, for the second media file, the probability value is about 60-90% of the predefined probability threshold value and the portion of the media file data to be deleted of the second media file comprises only the portion of the media file data of the second media file that can be regenerated by the model, for the third media file, the probability value is about 20-60% of the predefined probability threshold value and the portion of the media file data to be deleted of the third media file comprises at least the portion of the media file data of the third media file that can be regenerated by the model, and, for the fourth media file data, the probability value is about 20% or less of the predefined probability threshold value and the portion of the media file data to be deleted of the fourth media file comprises an entirety of the media file data of the fourth media file.

10. The computer program product according to claim 6, wherein the method further comprises:

generating, at the edge server, an internal mapping table to map elements of the media file data to surrounding elements of the media file data; and referring to the internal mapping table to ascertain the capability of the model to regenerate the media file data that has been deleted.

11. A computing system comprising:

a processor;

a memory coupled to the processor; and one or more computer readable storage media coupled to the processor, the one or more computer readable storage media collectively containing instructions that are executed by the processor via the memory to cause the processor to perform steps for context aware edge computing and progressive depletion of content comprising:

embedding, on an edge server, a model regenerates media file data portions of a media file, the media file being sourced from a main server and having media file data temporarily stored on the edge server;

receiving, at the edge server, a request for the media file;

determining, from the request, a probability value that a similar request will be received at the edge server;

comparing the probability value with a predefined probability threshold value;

identifying a portion of the media file data to be deleted from results of the comparing and from a capability of the model to regenerate the portion of the media file data to be deleted; and deleting the portion of the media file data in accordance with results of the identifying, wherein the identifying comprises considering the capability of the model to regenerate the portion of the media file data to be deleted with a given resolution, wherein the steps further comprise:

receiving, at the edge server, a subsequent request for the media file;

regenerating, by the model, the portion of the media file data to satisfy the subsequent request; and not passing the subsequent request to the main server, wherein the model is a generative adversarial network (GAN) enabled model with a hierarchical mode classifier for content retainment and progressive depletion and an internal mapping table and the steps further comprise:

generating, at the edge server, the internal mapping table to map elements of the media file data to previous frames and surrounding pixels of the media file data; and ascertaining the capability of the model to regenerate the media file data that has been deleted, wherein the media file comprises a video file and the regenerating, by the model, comprises next-frame prediction applied to the video file by reference to the hierarchical mode classifier for content retainment and progressive depletion and the internal mapping table.

12. The computing system according to claim 11, wherein the steps further comprise:

determining whether the media file data is stored on the edge server;

requesting the media file data from the main server; and storing the media file data received from the main server on the edge server.

13. The computing system according to claim 11, wherein:

the determining of the probability value comprises determining the probability value from a frequency of similar requests, a vicinity of an origin of the request to the edge server and a time of the request, the media file is a first media file, a second media file, a third media file and a fourth media file, for the first media file, the probability value is about 90% or higher of the predefined probability threshold value and a large portion of the media file data of the first media file is retained on the edge server, for the second media file, the probability value is about 60-90% of the predefined probability threshold value and the portion of the media file data to be deleted of the second media file comprises only the portion of the media file data of the second media file that can be regenerated by the model, for the third media file, the probability value is about 20-60% of the predefined probability threshold value and the portion of the media file data to be deleted of the third media file comprises at least the portion of the media file data of the third media file that can be regenerated by the model, and, for the fourth media file, the probability value is about 20% or less of the predefined probability threshold value and the portion of the media file data to be deleted of the fourth media file comprises an entirety of the media file data of the fourth media file.

14. The computing system according to claim 11, wherein the steps further comprise:

generating, at the edge server, an internal mapping table to map elements of the media file data to surrounding elements of the media file data; and referring to the internal mapping table to ascertain the capability of the model to regenerate the media file data that has been deleted.

* * * * *